United States Patent [19]

Tamaki et al.

[11] Patent Number: 4,472,467
[45] Date of Patent: Sep. 18, 1984

[54] POLYMER SURFACE TREATING METHOD

[75] Inventors: Hiroyuki Tamaki; Sumitaka Tatsuta, both of Shizuoka, Japan

[73] Assignee: Fuji Photo Film Co., Ltd., Kanagawa, Japan

[21] Appl. No.: 532,134

[22] Filed: Sep. 14, 1983

[30] Foreign Application Priority Data

Oct. 22, 1982 [JP] Japan ............................... 57-185418

[51] Int. Cl.³ .............................................. B05D 3/00
[52] U.S. Cl. ..................................... 427/444; 427/40; 427/374.1
[58] Field of Search ....................... 427/444, 40, 374.1

*Primary Examiner*—Bernard D. Pianalto
*Attorney, Agent, or Firm*—Sughrue, Mion, Zinn, Macpeak and Seas

[57] ABSTRACT

The present invention relates to a method for treating the surface of a polymer web comprising:
(1) heating a polymer web by vacuum glow discharge treatment; and
(2) cooling the resulting polymer web of step (1) at a higher temperature than the glass transition point of the polymer such that $T_n \geq T_{n-1} - 40$, wherein n is a positive integer, $T_0$ is the initial temperature (°C.) of the polymer web immediately after the vacuum glow discharge treatment of step (1) and $T_n$ is the temperature (°C.) of the polymer web that has been drawn past the nth cooling roll.

4 Claims, 2 Drawing Figures

POLYMER SURFACE TREATING METHOD

FIELD OF THE INVENTION

The present invention relates to a method of treating the surface of a polymer web. More particularly, the present invention relates to a vacuum glow discharge treatment method for treating the surface of a polymer web.

BACKGROUND OF THE INVENTION

Conventional techniques such as corona discharge treatment, UV irradiation treatment, vacuum glow discharge treatment and electrodeless discharge treatment have been used for improving the surface characteristics of plastic films and metal sheets. Among these techniques, vacuum glow discharge treatment has been extensively used in improving the receptivity of the surface of polymers to adhesives, coatings, water and dyes (see British Pat. No. 891,469 and U.S. Pat. No. 3,309,221).

Nonetheless, vacuum glow discharge treatment has some drawbacks in that the polymer web thus treated becomes excessively hot because (1) the polymer web is directly exposed to an activated plasma, and (2) the polymer web contacts the polymer web guiding rolls that become hot as a result of exposure to the activated plasma.

As described in Japanese Patent Application (OPI) No. 129262/78 (the symbol OPI as used herein means an unexamined published Japanese patent application), when coloration of the treated article is strictly prohibited in the production of photographic materials, the temperature of the article must be controlled within a certain range in order to provide the photographic materials with the desired receptivity to coatings.

If the polymer web of a non-crystalline polymer such as polystyrene becomes excessively hot, the polymer web greatly shrinks and its planarity is impaired such that it is no longer suitable for practical use. The same problem occurs with the polymer web of a crystalline polyester such as a biaxially oriented polyethylene terephthalate, i.e., it experiences partial thermal relaxation or deformation that impairs its flatness. In addition, low-molecular weight substances (e.g., monomers or oligomers) bleed out on the polymer web surface causing the polymer web to lose its transparency such that it is no longer suitable for practical use.

Furthermore, when non-thermosetting resins such as polystyrene and polyethylene terephthalate are heated, their modulus of elasticity is decreased because of their viscoelastic nature and they undergo plastic deformation due to external forces. Therefore, if polymer webs of these polymers are wound on tension applied will cause varying degrees of wrinkles or other surface defects such as the transfer of thicker portions if there is a variation in the polymer web thickness.

Another problem associated with excessive heating of the polymer web is that the active radicals that form as a result of exposure to the activated plasma become increasingly mobile so as to recombine with each other. This impairs the desired surface characteristics of the polymer web.

Therefore, many problems arise if the polymer web is heated excessively by vacuum glow discharge treatment and by contact with heated guiding rolls or left at elevated temperatures after it is wound up to rolls.

SUMMARY OF THE INVENTION

An object of the present invention is to provide a method for treating the surface of a polymer web so as to render it receptive to coatings without causing any surface defects that arise due to excessive heating of the web.

The above object has been met in a method comprising:

(1) heating a polymer web by vacuum glow discharge treatment (2) cooling the resulting polymer web of step (1) at a temperature higher than the glass transition point of the polymer such than $T_n \geq T_{n-1} - 40$, wherein n is a positive integer, $T_0$ is the initial temperature (°C.) of the polymer web immediately after the vacuum glow discharge treatment of step (1), i.e., where n is 1 and Tn is the temperature (°C.) of the polymer web that has been drawn past the nth cooling roll.

DETAILED DESCRIPTION OF THE INVENTION

As stated above, the present invention relates to a method for treating the surface of a polymer web comprising:

(1) heating a polymer web by vacuum glow discharge treatment; and (2) cooling the resulting polymer web of step (1) at a higher temperature than the glass transition point of the polymer such that $T_n \geq T_{n-1} - 40$, wherein n is a positive integer, $T_0$ is the initial temperature (°C.) of the polymer web immediately after the vacuum glow discharge treatment of step (1) and $T_n$ is the temperature (°C.) of the polymer web that has been drawn past the nth cooling roll.

The difference between the temperature of the polymer web cooled by a particular roll and that of the polymer web cooled by the next roll should not be greater than 40° C. However, the polymer web may be cooled to room temperature after it has been cooled to a temperature lower than the glass transition point of the polymer (Tg).

If the polymer web is hotter than its glass transition point (Tg) and is cooled such that the difference between the temperature of the polymer web cooled by a particular roll and that of the polymer web cooled by the next roll is greater than 40° C., the dimensions of the polymer web greatly change due to the heat generated in the polymer surface such that defects occur, e.g., baggy or dimples occur. Furthermore, in such a situation, a sudden heat shrinkage occurs in the polymer web which causes an abrasion on the polymer web.

The method of the present invention is hereafter described by reference to the accompanying drawings.

Figure 1:
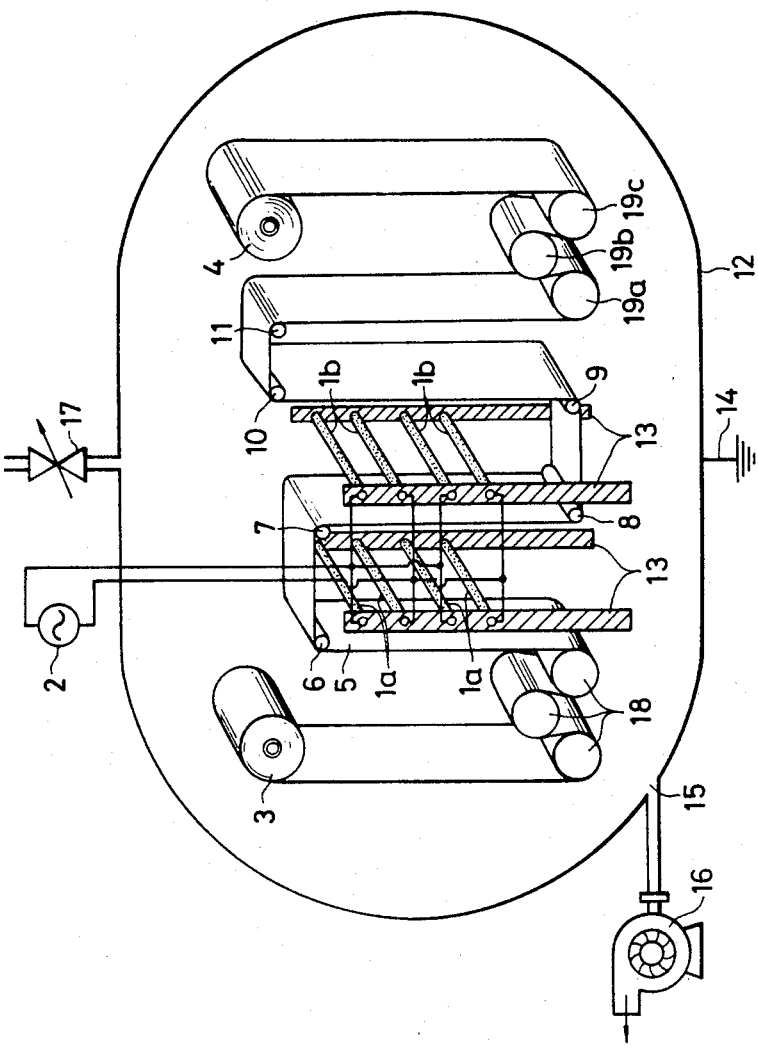
FIG. 1 is a schematic representation of an apparatus employed in the method of the present invention.

FIG. 1 is a schematic representation of an apparatus employed in the method of the present invention, wherein 1a and 1b are opposing rod electrodes disposed at a given interval for effecting a glow discharge; 2 is a high-voltage power supply; 3 is a supply roll for the polymer web; 4 is a takeup roll; 5 is the polymer web; 6, 7, 8, 9, 10 and 11 are guide rolls; 12 is a vacuum chamber; 13 is an insulator for retaining the electrodes; 14 is a ground; 15 is an air outlet; 16 is a vacuum pump; 17 is a leak valve for controlling the degree of vacuum created in chamber 12; 18 is a train of preheating drive rolls; and 19 (a–c) is a train of cooling rolls.

The polymer web 5 unwound from supply roll 3 is preliminarily heated by rolls 18. Next, one side of the polymer web is subjected to vacuum glow discharge treatment by electrodes 1a. Then, the polymer web is reversed by guide rolls 6 and 7 and the other side of the polymer web is subjected to vacuum glow discharge treatment by electrodes 1b. Thereafter, the polymer web is drawn past rolls 19a, 19b and 19c for cooling according to the method of the present invention. After cooling, the web is taken up by roll 4.

Coolings rolls 19a, 19b and 19c are designed so that a coolant, supplied from reservoirs connected to the respective rolls, is circulated through their interiors. The individual rolls can establish different cooling temperatures by controlling the temperatures of the coolant in each reservoir.

If $T_1$ (°C.), $T_2$ (°C.) and $T_3$ (°C.) indicate the temperatures achieved by the respective rolls 19a, 19b and 19c, and $T_0$ (°C.) is the initial temperature of the web immediately after the vacuum glow discharge treatment, cooling is conducted in the present invention if the polymer web is hotter than the glass transition point of the polymer (Tg) (°C.), in the following manner:

$$T_1 \geq T_0 - 40,$$

$$T_2 \geq T_1 - 40,$$

$$T_3 \geq T_2 - 40.$$

If $T_2$ is lower than the glass transition point (Tg) of the polymer, $T_3$ is not limited to the above relationship.

If all of the above relationships are not met, surface defects such as baggy or dimples, as well as abrasions will arise. If the temperature difference between adjacent rolls is too small, the number of cooling rolls must be increased. This undesirably increases the initial cost and the equipment size.

The peripheral velocity of each cooling roll may be equal to the polymer web transport velocity. However, if the polymer web is formed of a polymer that will shrink due to cool, the diameter of the successive rolls may be gradually decreased to allow for the possible shrinkage due to cooling. This is effective for preventing the occurence of abrasion on the web.

The diameter of each cooling roll is such that each cooling roll is kept in contact with the polymer was for at least 1.5 seconds. In this manner, the temperature of the polymer web can be made substantially equal to the value established for each roll.

The advantages of the present invention will become more apparent by the following example. This example is given for illustrative purposes only and is in no way intended to limit the scope of the present invention.

EXAMPLE

An apparatus of the type shown in FIG. 1 was used. In this apparatus, a row of four cylindrical electrodes (3 cm in diameter and 40 cm long) spaced apart by 10 cm were arranged side-by-side in a vacuum chamber next to four cylindrical electrodes of the same size. A biaxially oriented polyester film, 100μ thick and 30 cm wide, was caused to travel through the glow discharge zone along the electrodes at a distance of 15 cm and with a dwell time of 2 seconds. The electrodes were connected to a power supply that provided the polyester film with an energy of 200 watts×min/m². The pressure in the chamber was 0.3 Torr and the discharging frequency was 10 kHz. The temperature of the film upon passing through the discharge zone was measured with an infrared pyrometer. The temperature was found to be 145° C. The polyester employed had a glass transition point of 80° C. Therefore, the film was cooled according to the present invention at temperatures higher than the glass transition point of the polyester such that the difference in temperature between two adjacent rolls was not greater than 40° C. If the film temperature was lower than the glass transition point of the polyester, the film was immediately cooled to room temperature. This requirement was met by holding the film in contact for two seconds with each three rolls maintained at 110° C., 75° C. and 20° C., respectively. As a result, the film was cooled to 112° C. by the first roll, then to 80° C. by the second roll, and finally to 28° C. by the third roll. The film so cooled was wound on a takeup roll under a tension of 2 kg and identified as Sample No. 1.

Sample No. 2 was prepared by repeating the same procedure above except that the film heated to 145° C. was immediately wound on the takeup roll without cooling.

Sample No. 3 was prepared by repeating the same procedure above except that the film was cooled by three rolls, maintained at 95° C., 50° C. and 20° C., respectively.

The three samples were tested for their resistance to baggy dimples and abrasion, as well as for their receptivity to coatings (both in a dry state and in a wet state) by the following methods.

(a) Baggy

Figure 2:
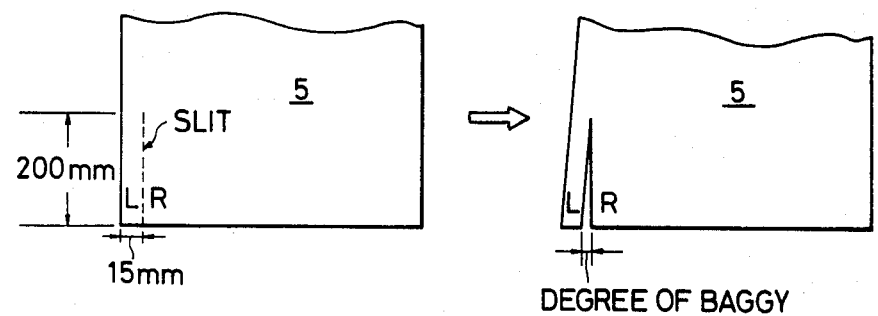
FIG. 2 shows how a polymer web treated by the method of the present invention can be checked for possible planarity defect so called "baggy".

As shown in FIG. 2, a slit 20 cm long was cut along a line 15 mm apart from, and parallel to, the left edge of each sample (30 cm wide). After standing on a level surface a sample effected by baggy revealed offsetting of the left side (indicated at L in FIG. 2) and the right side of (indicated at R in FIG. 2) of the cut. The degree of baggy was evaluated in terms of the distance between the two sides.

(b) Dimples

The samples were visually checked for the presence of tiny dimples under a fluorescent lamp. A sample entirely free from dimples was rated Class A; one having its whole surface affected by tiny dimples was rated Class C; and one which was between the two states was rated Class B.

(c) Abrasion

The samples were visually checked for the presence of abrasion under a tungsten lamp. A sample entirely free of abrasion was rated Class A; one having its whole surface affected by abrasion was rated Class C; and one which was between the two states was rated Class B.

(d) Adhesion test in a dry state

The samples were coated with a conventional silver halide emulsion for lithography and the adhesive strength of the resulting emulsion layer was checked by the following procedure.

Six parallel grooves, 5 mm apart, were cut into the emulsion layer of each sample with a razor blade. Each sample was rotated by 90° and the same cutting process was repeated to thereby form a grid pattern of 5 mm squares cut into the emulsion coating. An adhesive polyester tape manufactured by Nitto Chemical Industry Co., Ltd. was applied over the cross-hatched area and quickly stripped back over itself.

The sample was rated Class A if no square in the grid was pulled off; rated Class B if some squares were pulled off; and Class C if all of the squares were pulled off.

(e) Adhesion test in a wet state

After being coated with a silver halide emulsion as in (d), each sample was photographically processed by development, fixing and washing. Using an iron stylus, two scratches were cut in each sample crosswise while each sample was immersed in a processing solution. The scratched areas were rubbed with a finger in a direction perpendicular to one of the two cuts.

The samples were rated Class A if the stripped part of the emulsion coating was not larger than the scratched area; Class B if the stripped part of the emulsion coating was not longer than 5 mm; and Class C if the stripping was more severe.

The results of the above tests are shown in Table I below.

TABLE I

| Sample No. | baggy | tiny dimples | abrasion | adhesion dry | wet |
| --- | --- | --- | --- | --- | --- |
| 1 | 0.5 mm | A | A | A | A |
| 2 | 5.0 mm | C | A | B | B |
| 3 | 1.0 mm | B | C | A | A |

As Table I above shows, the method of the present invention is capable of providing the surface of a polymer web with the desired flatness and adhesiveness to coatings.

The present invention is not limited to the illustrated example. That is, the present invention is also applicable to the treatment of a polymer web by vacuum glow discharge in an atmosphere produced by gas emitted from the web while it is exposed to an achieved plasma shielded from external air.

We claim:

1. A method for treating the surface of a polymer web comprising:
    (1) heating a polymer web by vacuum glow discharge treatment; and
    (2) cooling the resulting polymer web of step (1) at a temperature higher than the glass transition point of the polymer such that $T_n \geq T_{n-1} - 40$, wherein n is a positive integer, $T_0$ is the initial temperature (°C.) of the polymer web immediately after the vacuum glow discharge treatment of step (1) and $T_n$ is the temperature (°C.) of the polymer web that has been drawn past the nth cooling roll.

2. The method as in claim 1 wherein when $T_n$ is lower than the glass transition point of the polymer, the polymer web may be immediately cooled to room temperature.

3. The method as in claim 1 wherein the diameter of each cooling roll is such that each cooling roll is kept in contact with the polymer web for at least 1.5 seconds.

4. The method as in claim 1 wherein said vacuum glow discharge treatment is conducted in an atmosphere produced by gas emitted from the web while it is exposed to an activated plasma shielded from external air.

* * * * *